United States Patent [19]
Jensen

[11] 4,090,737
[45] May 23, 1978

[54] AGRICULTURAL SPOKE WHEEL

[76] Inventor: Arthur E. Jensen, 11372 SW. Skyline, Santa Ana, Calif. 92705

[21] Appl. No.: 730,540

[22] Filed: Oct. 7, 1976

[51] Int. Cl.² ............................................. B60B 23/00
[52] U.S. Cl. ...................................... 301/12 R; 301/59
[58] Field of Search ...................... 301/95, 95 B, 95 C, 301/12 R, 12 M, 55, 58–61, 67–85, 104, 105 R, 105 B

[56] References Cited

U.S. PATENT DOCUMENTS

| 369,850 | 9/1887 | Harris ..................................... 301/61 |
| 528,887 | 11/1894 | Myers ..................................... 301/58 |
| 574,139 | 12/1896 | Curry ..................................... 301/58 |
| 704,234 | 7/1902 | Brunnemer .............................. 301/67 |

FOREIGN PATENT DOCUMENTS 486,772  6/1938  United Kingdom ................... 301/59

*Primary Examiner*—Stanley H. Tollberg
*Assistant Examiner*—H. Grant Skaggs
*Attorney, Agent, or Firm*—Frederick E. Mueller

[57] ABSTRACT

An improved wheel construction for agricultural apparatus, such as wheel-move irrigation pipe lines, has a hub and an annular rim joined by spokes releasably attached at their ends to the hub and rim in a manner such that the wheel may be knocked down or disassembled for storage and shipment and easily assembled at the point of use. The inner spoke ends are releasably joined to the hub by unique coupling structure which are engagable to firmly interlock the spokes to the hub and are releasable to separate spokes from the hub solely by relative movement of the spokes and hub between interlock and release positions.

7 Claims, 4 Drawing Figures

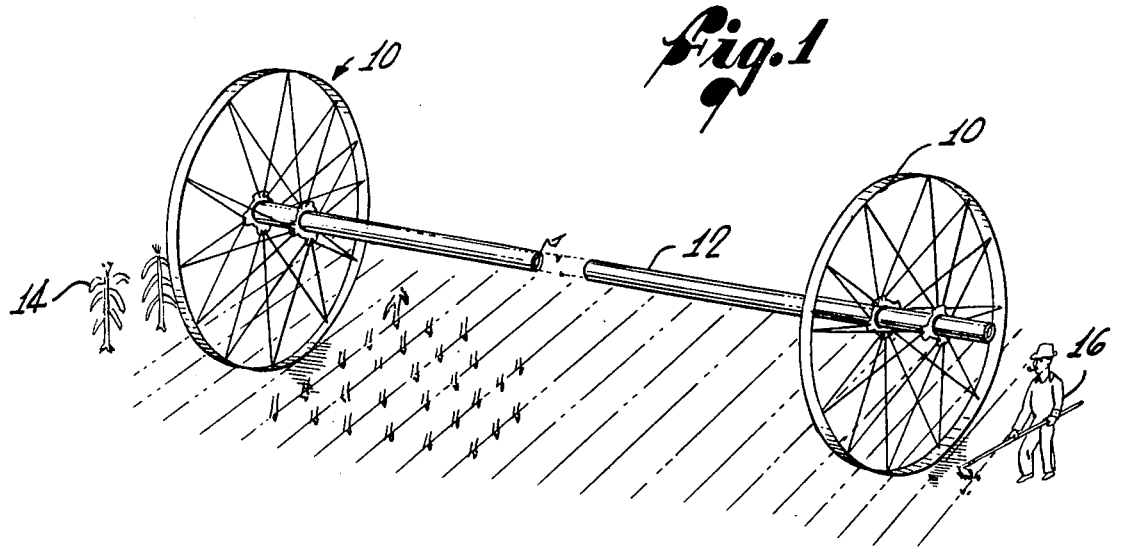
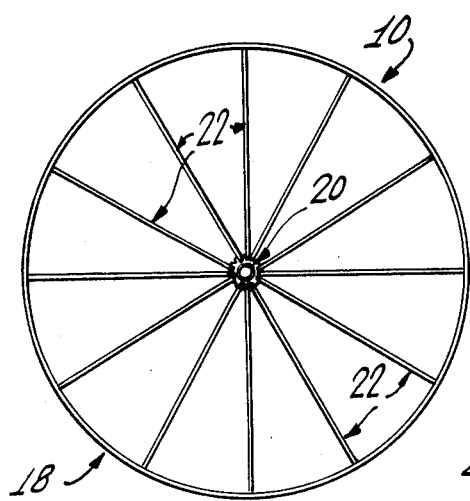
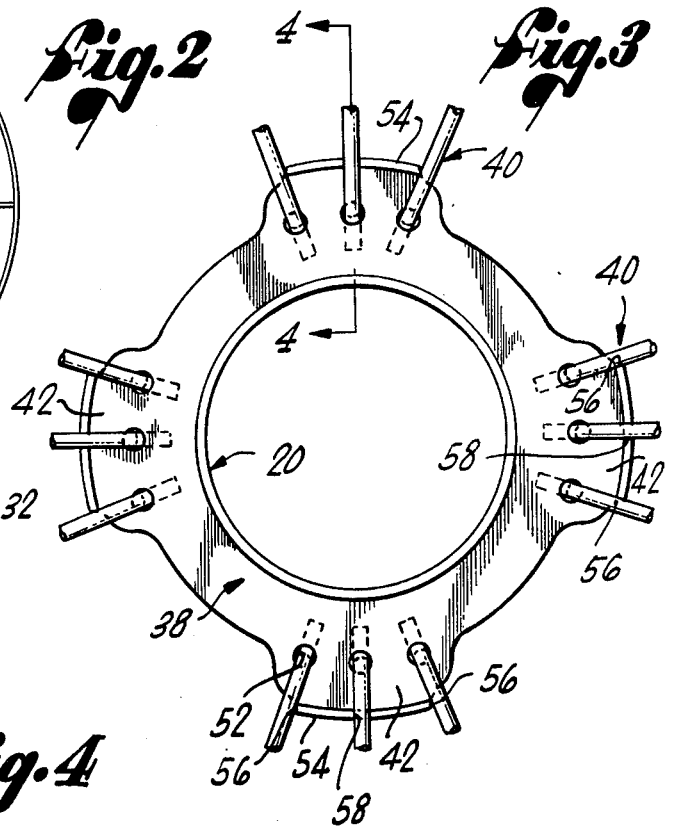
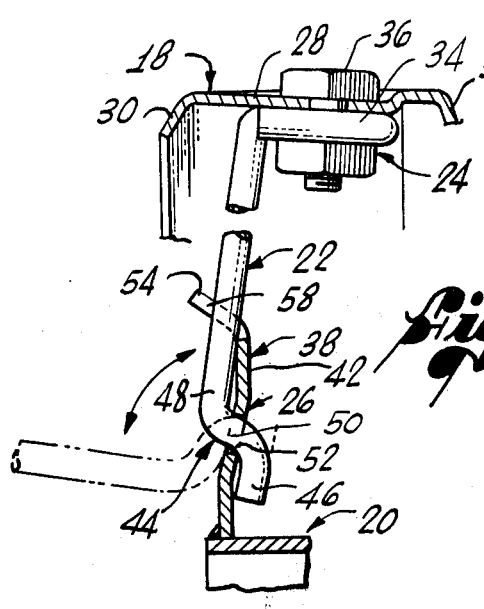

AGRICULTURAL SPOKE WHEEL

BACKGROUND OF THE INVENTION

1. Field of the Invention

This invention relates generally to agricultural equipment and more particularly to an improved knock down wheel construction for agricultural apparatus such as so-called wheel-move irrigation pipe lines.

2. Prior Art

As will appear from the ensuing description, the improved agricultural wheel construction of the invention may be used on a variety of agricultural machines. The wheel construction, however, is intended primarily for so-called wheel-move irrigation pipe lines and will be described in this context.

Wheel-move irrigation pipe lines are well known and widely used in agriculture and hence need not be described in elaborate detail. Simply described, a wheel-move irrigation pipe line comprises a long (e.g., quarter mile) irrigation line composed of pipe sections coupled end to end and supported at intervals by wheels surrounding the pipe. Each wheel has a central hub through which the pipe extends, whereby the irrigation pipe line may roll across the field from one irrigating position to another. A power means is provided for driving the wheels, or turning the pipe, to propel the wheel line in its rolling movement. Mounted on the irrigation pipe at intervals therealong are irrigation sprinklers, such as the well known impulse or Rainbird sprinklers which receive water through the pipe. The detailed construction and mode of operation of such apparatus is disclosed in my U.S. Pat. No. 3,147,764.

In operation of such an irrigation pipe line, the pipe must be located at a sufficient elevation above the ground to clear the fully grown crops in the crop rows or at least avoid damaging contact with the crops. This required elevation of the irrigation pipe, in turn, determines the diameter of the pipe line wheels since the wheels must have a radius equal to the required pipe elevation. As a consequence, irrigation pipe line wheels are often quite large in diameter and, in some cases, may have a diameter on the order of 12 to 14 feet or more. Because of this large diameter, the weight and strength of the wheels are critical factors in the design of such an irrigation pipe line. Thus, the wheels must possess sufficient strength and rigidity not only to support their own dead weight and that of the water loaded irrigation pipe when stationary during irrigation but, also, to resist the torsion and bending loads to which the wheels are subjected during rolling of the line from one location to the other. On the other hand, the wheels, as well as the other components of an irrigation pipe line, must be sufficiently light to enable the pipe line to be shipped to and handled and assembled by the user.

Further, because of their relatively large size, irrigation pipe line wheels of the kind under discussion, cannot be conveniently shipped in their assembled condition. As a consequence, such wheels must be designed for shipment in a knocked down or disassembled condition and for subsequent assembly by the user. The assembly procedure should be relatively simple and quick to accomplish and capable of accomplishment without the use of special tools. Also, of course, the wheels should be relatively economical to manufacture, simple in construction, and reliable in operation.

Irrigation pipe line wheels of this general kind, of course, have been devised. One such wheel construction, for example, is described in my prior U.S. Pat. No. 3,218,105. Because of the necessity of satisfying the above requirements, most of the existing irrigation pipe line wheels, as well as that of the present invention, are spoked wheels having a hub, an annular ring-like rim surrounding the hub, and spokes extending between and joining the rim and the hub. In my aforementioned patent, the spokes are bolted to the hub and rim and the rim is constructed in sections bolted to one another such that the wheel may be shipped in a knock down or disassembled condition and then reassembled at the point of use.

SUMMARY OF THE INVENTION

This invention provides an improved irrigation pipe line wheel construction of superior strength and lightness. This improved wheel construction has a hub surrounded by an annular rim, comprised of rim segments, and spokes of a novel configuration extending between and releasably joined to the hub and rim, whereby the wheel components may be knocked down for shipment and then speedily assembled at the point of use.

The invention is of particular utility in manufacturing large diameter agricultural wheels in an economic manner. To this end a novel spoke configuration is provided, as well as novel hub coupling means for releasably joining the inner ends of the wheel spokes to the wheel hub. These hub coupling means are uniquely constructed and arranged in a manner such that each spoke may be joined to and separated from the hub solely by relative movement of the spoke and hub between positions referred to herein as release and interlock positions. In its release position, each spoke is freely separable from the hub. In its interlock position, each spoke extends laterally of the hub for connection to the wheel rim and is firmly interlocked to the hub against movement relative to the hub both lengthwise of the spoke, i.e., radially of the hub, and laterally of the spoke in the circumferential direction of the hub. A driving torque may thus be transmitted from the hub through the spokes to the rim.

In the preferred wheel construction described, the hub coupling means for each wheel spoke comprises a generally S-shaped bend or joggle at the inner spoke end having a pair of laterally offset portions integrally joined by an intervening laterally extending transverse portion, and a flange on the wheel hub having a hole or notch for receiving the S-bend. In the interlock position of the hub and each spoke, the transverse portion of the spoke bend extends through the respective hub flange hole with the laterally offset bend portions of the spoke disposed at opposite sides of the flange in such a way as to firmly interlock the spoke to the flange with the spoke extending laterally out from the hub for connection to the wheel rim. In the release position of each spoke, the latter extends generally axially of the hub in a manner which permits the inner spoke end to be freely withdrawn from the coupling flange hole in a longitudinal direction of the spoke.

BRIEF DESCRIPTION OF THE DRAWINGS

FIG. 1 is a fragmentary perspective view of a wheel-move irrigation pipe line embodying the improved wheel construction of the invention;

FIG. 2 is a side view of one of the pipe line wheels;

FIG. 3 is an enlargement of the wheel hub in FIG. 2; and

FIG. 4 is a section, taken substantially along line 4—4 in FIG. 3, through the wheel hub, rim, and one spoke illustrating the manner of releasable attachment of the spoke to the hub and rim and, in broken lines, the manner of releasing the spoke from the hub.

DESCRIPTION OF THE PREFERRED EMBODIMENT

As noted earlier, a wheel move irrigation pipe line of the kind to which the preferred embodiment of this invention pertains comprises a long irrigation pipe supported at intervals by large wheels having hubs through which the pipe extends. The pipe is constructed of several sections coupled end to end by couplers which may be the wheel hubs. FIG. 1 illustrates a portion of such a wheel move irrigation pipe line including a pair of wheels 10 and one section 12 of the irrigation pipe, hereinafter referred to for convenience simply as the irrigation pipe. As noted earlier, powered drive means, e.g., a gas engine, are commonly provided for driving the pipe line across the ground from one irrigation position to another. For the sake of clarity, this drive means has been omitted from the drawings.

As noted earlier, irrigation pipe line wheels of the kind illustrated are often quite large in diameter in order to locate the irrigation pipe 12 above the crops to be irrigated. In this regard, attention is directed to FIG. 1, wherein some idea of the large size of the wheels may be gained from the size of the wheels compared to the crops 14 to be irrigated, which may be corn stalks, for example, and a worker 16.

Wheels 10 embody the improved knock down wheel construction of this invention which permits the wheels to be knocked down or disassembled for storage and shipment and then reassembled at the point of use by the user with relative ease and without the aid of special tools. This improved wheel construction is relatively light weight and yet sufficiently rugged to withstand the loads imposed on the wheel in use. Moreover, the wheel construction is relatively simple, economical to fabricate, and reliable in operation. Since the two wheels 10 illustrated are identical, a description of one will suffice for both.

Wheel 10 has an outer annular rim 18, a central hub 20, and spokes 22, of solid rod material, extending between and joining the rim and hub. The outer ends of the spokes 22 are releasably joined to the rim 18 by outer coupling means 24, hereinafter referred to as rim coupling means. The inner ends of the spokes 22 are releasably joined to the hub 20 by inner coupling means 26 referred to herein as hub coupling means. Although the rim 18 is not so illustrated, it preferably embodies the segmented knock down sheet metal construction of the wheel rim described in my earlier mentioned U.S. Pat. No. 3,218,105. For simplicity in this disclosure, the wheel rim 18 is shown as comprising simply an annular metal ring or band 28 having in turned flanges 30 and 32 along its edges.

Insofar as the present invention is concerned, any suitable rim coupling means may be utilized to releasably join the outer ends of the spokes 22 to the rim 18. The particular rim coupling means 24 shown comprises a bend at the outer end of each spoke forming an eye or ring 34 in a transverse plane of the spoke which seats against the inner side of the rim band 28 and is releasably joined to the rim by a nut and bolt 36, which may also be the junction of a pair of rim segments. Thus, the outer end of each spoke 22 may be released from the rim 18 by removing the coupling bolt 36.

The inner hub coupling means 26 and the spokes 22 are uniquely constructed and arranged in a manner such that each spoke may be interlocked to and released from the wheel hub 20 solely by relative movement of the spoke and hub between an interlocked position, shown in solid lines in FIG. 4, and a release position, shown in broken lines in FIG. 4. In its interlock position, each spoke 22 extends laterally out from the hub 20 for connection to the rim 18 and is interlocked to the hub against movement relative to the hub both in the longitudinal direction of the spoke, i.e., radially of the hub, and laterally of the spoke in the circumferential direction of the hub. In its release position, each spoke extends generally axially of the hub and is freely separable from the hub by longitudinal movement of the spoke relative to the hub. Thus, each spoke 22 is releasably joined to the hub 20 without the aid of separate fasteners any may be attached to and separated from the hub without the use of any tools.

Referring now in more detail to the drawings, the illustrated, preferred inner hub coupling means 26 for the spoke 22 comprise annular coupling flanges 38 rigidly joined to the ends of the wheel hub 20 and surrounding the hub in transverse planes of the hub. Hub 20 is a sleeve which is internally sized to receive the irrigation pipe 12, usually with a press fit. Flanges 38 may comprise relatively heavy guage sheet metal rings welded to the ends of the hub sleeve, as shown. Also as shown, spokes 22 extend between each hub flange 38 and the rim 18 with the spokes arranged in groups 40. In this case, each spoke group 40 contains 3 spokes and each hub coupling flange 38 has a radially enlarged portion or lobe 42 for each spoke group 40.

In addition to the respective hub flange 38, the hub coupling means 26 for each spoke 22 comprises a joggle or an S-bend 44 at the inner end of the spoke. This S-bend forms at the inner spoke end laterally offset spoke portions 46, 48, and an intervening laterally extending transverse spoke portion 50 between and integrally joining the offset portions. For convenience, the inner offset spoke portion 46 is hereafter referred to in places as a terminal offset portion and the offset portion 48 as a remaining offset portion.

Referring to FIG. 4, in the interlock position of each spoke 22, the transverse portion 50 of its S-bend 44 extends through a hole 52 in one of the enlarged portions 42 of the respective hub coupling flange 38. The offset spoke portions 46, 48 are disposed at opposite sides of the flange, as shown in FIG. 4, to firmly interlock the spoke to the flange against movement relative to the flange and hence relative to the hub 20 in the longitudinal direction of the spoke. In the particular wheel embodiment shown, the terminal portion 46 of each spoke bend 44 is located at the axially inner side of the hub flange 38 and the remaining offset spoke portion 48 is located at the outer side of the flange. Each enlarged portion 42 of the hub flanges 38 is bent inwardly at a small angle to accomodate the slight inward inclination of the spoke hubs 22 resulting from the longer axial dimension of the wheel hub 20 compared to that of the rim 18.

Each enlarged portion 42 of each hub flange 38 has an out-turned edge lip 54 providing circumferentially facing end edges 56 engagable by the offset portions 48 of the two outer spokes 22 of the respective spoke group 40 and a notch 58 receiving the offset portion 48 of each remaining spoke of the group. The side edges of each notch 58 and the end edges 56 of the flange lips 54 form shoulders facing circumferentially of the hub 20 for interlocking the spokes 22 to the hub against lateral movement of the spokes relative to the hub in the circumferential direction of the hub. This circumferential interlocking action permits transmission of torque between the hub and rim of each wheel through the wheel spokes.

It will now be understood that in the interlocking position of the spokes 22 of each wheel, shown in solid lines in FIG. 4, the spokes are interlocked to the hub 20 against movement relative to the hub both lengthwise of the spokes, i.e., radially of the hub, and laterally of the spokes in the circumferential direction of the hub. The spoke and hub are retained in this interlocked condition by attachment of the outer spoke ends to the wheel rim 18. The spokes may be released from the rim 18 by removing their rim coupling bolts 36. Thereafter, the spokes may be turned to their broken line release positions of FIG. 4 and separated from the hub 20 by withdrawing the inner S-bends 44 of the spoke from the hub flange holes 52. The wheel is reassembled by reversing this procedure.

It will now be understood that the wheel 10, when assembled, has a relatively rugged and yet lightweight construction which is capable of withstanding the loads imposed on the wheel during its use in a wheel-move irrigation pipe line of the kind illustrated. Moreover, the wheel may be readily knocked down for storage and shipment and then quickly and easily reassembled at the point of use without any special tools. Moreover, the wheel has a relatively simple, reliable construction which may be economically fabricated.

I claim:

1. A wheel construction for agricultural apparatus comprising:
   a rim,
   a hub,
   spokes extending from said hub to said rim,
   each spoke having at its inner end a generally S-bend forming a pair of laterally offset longitudinal spoke portions joined by an intervening transverse spoke portion,
   a sheet metal flange surrounding said hub in a transverse plane of said hub and having a hole for each spoke inwardly from the flange edge through which said transverse portion of the respective spoke extends with said offset spoke portions located at opposite sides of the flange, whereby each spoke is rotatable relative to its flange between an interlock position wherein the spoke extends laterally out from said hub to said rim with its offset spoke portions seating against opposite sides of said flange to interlock the spoke against endwise movement relative to the flange, and a release position wherein the spoke extends generally longitudinally of said hub for endwise withdrawal of the spoke from its respective flange hole,
   the outer edge of said flange being turned to form sheet metal lip means projecting beyond one side of and extending circumferentially about said flange, and providing circumferentially facing shoulder means engaging one of said offset portions of each spoke when the latter occupies its interlock position for restraining the respective spoke against lateral movement circumferentially of said hub, and
   rim coupling means releasably joining the outer end of each spoke to said rim.

2. The wheel according to claim 1 wherein:
   said spokes are arranged in groups spaced circumferentially about said hub, and each spoke group includes two outer spokes and a remaining spoke between said two outer spokes, and
   said flange lip means includes a lip for each spoke group having circumferentially facing end edges engaging offset portions of the two outer spokes in the group and a notch between said end edges receiving an offset portion of said remaining spoke in the group.

3. The wheel according to claim 2 wherein:
   said rim coupling means for each spoke comprises an annular bend at the outer spoke end forming a ring in a transverse plane of the spoke seating against the radially inner side of said rim, and a bolt extending through said ring and rim.

4. The wheel according to claim 3 wherein:
   said hub comprises a sleeve having a pair of said flanges spaced axially of the sleeve, and
   said wheel includes a first set of spokes extending between said rim and one flange and a second set of spokes extending between said rim and the other flange.

5. A wheel construction for agricultural apparatus comprising:
   a rim,
   a hub,
   spokes extending from said hub to said rim,
   each spoke having at its inner end a generally S-bend forming a pair of laterally offset longitudinal spoke portions joined by an intervening transverse spoke portion,
   a flange surrounding said hub in a transverse plane of said hub having a hole for each spoke inwardly from the flange edge through which said transverse portion of the respective spoke extends with said offset spoke portions located at opposite sides of the flange, whereby each spoke is rotatable relative to said flange between an interlocked position wherein the spoke extends laterally out from said hub to said rim and has its offset spoke portions seating against opposite sides of said flange to interlock the flange against endwise movement relative to the flange and a release position wherein the spoke extends generally longitudinally of said hub for endwise withdrawal of the spoke from its respective flange hole,
   said offset portions of each spoke including a terminal offset portion at the free spoke end located at one side of said hub flange and a remaining offset portion at the opposite flange side,
   lip means along the edge of said flange projecting beyond said opposite flange side and having circumferentially facing shoulder edges engaging said remaining portions of said spokes for restraining the spokes against lateral movement circumferentially of said hub,
   said spokes being arranged in groups spaced circumferentially about said hub, and each spoke group including a pair of outer spokes and a remaining spoke between the two outer spokes,
   said flange lip means including a flange lip for each spoke group having circumferentially facing end shoulder edges engaging said remaining offset portions of the two outer spokes in the group and a notch receiving said remaining offset portion of the remaining spoke in the group, and rim coupling means releasably joining the outer end of each spoke to said rim.

6. The wheel according to claim 5 wherein:

said rim coupling means for each spoke comprises an annular bend at the outer spoke end forming a ring in a transverse plane of the spoke seating against the radially inner side of said rim, and a bolt extending through said ring and rim.

7. The wheel according to claim 6 wherein:

said hub comprises a sleeve having a pair of said flanges spaced axially of said sleeve, and said wheel includes a first set of spokes extending between said rim and one flange and a second set of spokes extending between said rim and the other flange.

* * * * *